United States Patent [19]

Schmidt et al.

[11] Patent Number: 5,252,302
[45] Date of Patent: Oct. 12, 1993

[54] LIQUID FERTILIZER APPARATUS

[76] Inventors: George Schmidt; Tammy L. Schmidt, both of P.O. Box 154 SR 4016, Preston Park, Pa. 18455

[21] Appl. No.: 915,327
[22] Filed: Jul. 20, 1992
[51] Int. Cl.$^5$ .............................................. B01D 12/00
[52] U.S. Cl. ...................... 422/261; 47/48.5; 47/80; 71/64.11; 220/4.12; 220/529; 220/565; 422/266
[58] Field of Search ................. 422/261, 266; 220/206, 220/565, 4.12, 403, 529, 519, DIG. 6; 47/48.5, 80, 81; 71/64.11, 901

[56] References Cited

U.S. PATENT DOCUMENTS

| | | | |
|---|---|---|---|
| 1,992,878 | 2/1935 | Muller | 47/80 |
| 3,442,385 | 5/1969 | Nash | 422/261 |
| 3,709,675 | 1/1973 | Austin | 71/36 |
| 3,850,344 | 11/1974 | Burge et al. | 422/266 |
| 4,816,222 | 3/1989 | Fagrell | 422/261 |
| 4,908,986 | 3/1990 | Rowland et al. | 47/80 |
| 4,936,335 | 6/1990 | Macon | 422/261 |
| 5,181,951 | 1/1993 | Cosse, Jr. | 71/909 |

FOREIGN PATENT DOCUMENTS 2146216 4/1985 United Kingdom .................. 47/81

Primary Examiner—James C. Housel
Assistant Examiner—Laura E. Collins
Attorney, Agent, or Firm—Leon Gilden

[57] ABSTRACT

A container is arranged to include an internal cavity to receive at least one porous bag member therewithin, with the porous bag member arranged to contain manure and composting therewithin for seepage into the container when fluid is directed therein. A modification of the container structure is arranged to include a plurality of support members, each including a screen grid floor to permit screening of various components to prevent their flow from the container. Sponge inserts are arranged for positioning selectively on each screen floor to impart various additives into a fertilizer solution.

1 Claim, 4 Drawing Sheets

LIQUID FERTILIZER APPARATUS

BACKGROUND OF THE INVENTION

1. Field of the Invention

The field of invention relates to fertilizer producing apparatus, and more particularly pertains to a new and improved liquid fertilizer apparatus wherein the same is arranged to provide for a container to accommodate fertilizer components therewithin.

2. Description of the Prior Art

Formation of liquid fertilizer by various prior art means is exemplified in the U.S. Pat. Nos. 4,505,723; 3,711,269; 3,709,675; 3,649,239; and 3,536,472.

The prior art has heretofore failed to provide for an organization arranged for ease of use as well as effectiveness in construction as set forth by the instant invention and in this respect, the present invention substantially fulfills this need.

SUMMARY OF THE INVENTION

In view of the foregoing disadvantages inherent in the known types of fertilizer producing apparatus now present in the prior art, the present invention provides a liquid fertilizer apparatus wherein the same is arranged to effect fluid saturation from a porous bag member directed into an associated container. As such, the general purpose of the present invention, which will be described subsequently in greater detail, is to provide a new and improved liquid fertilizer apparatus which has all the advantages of the prior art fertilizer producing apparatus and none of the disadvantages.

To attain this, the present invention provides a container arranged to include an internal cavity to receive at least one porous bag member therewithin, with the porous bag member arranged to contain manure and composting therewithin for seepage into the container when fluid is directed therein. A modification of the container structure is arranged to include a plurality of support members, each including a screen grid floor to permit screening of various components to prevent their flow from the container. Sponge inserts are arranged for positioning selectively on each screen floor to impart various additives into a fertilizer solution.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved liquid fertilizer apparatus which has all the advantages of the prior art fertilizer producing apparatus and none of the disadvantages.

It is another object of the present invention to provide a new and improved liquid fertilizer apparatus which may be easily and efficiently manufactured and marketed.

It is a further object of the present invention to provide a new and improved liquid fertilizer apparatus which is of a durable and reliable construction.

An even further object of the present invention is to provide a new and improved liquid fertilizer apparatus which is susceptible of a low cost of manufacture with regard to both materials and labor, and which accordingly is then susceptible of low prices of sale to the consuming public, thereby making such liquid fertilizer apparatus economically available to the buying public.

Still yet another object of the present invention is to provide a new and improved liquid fertilizer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
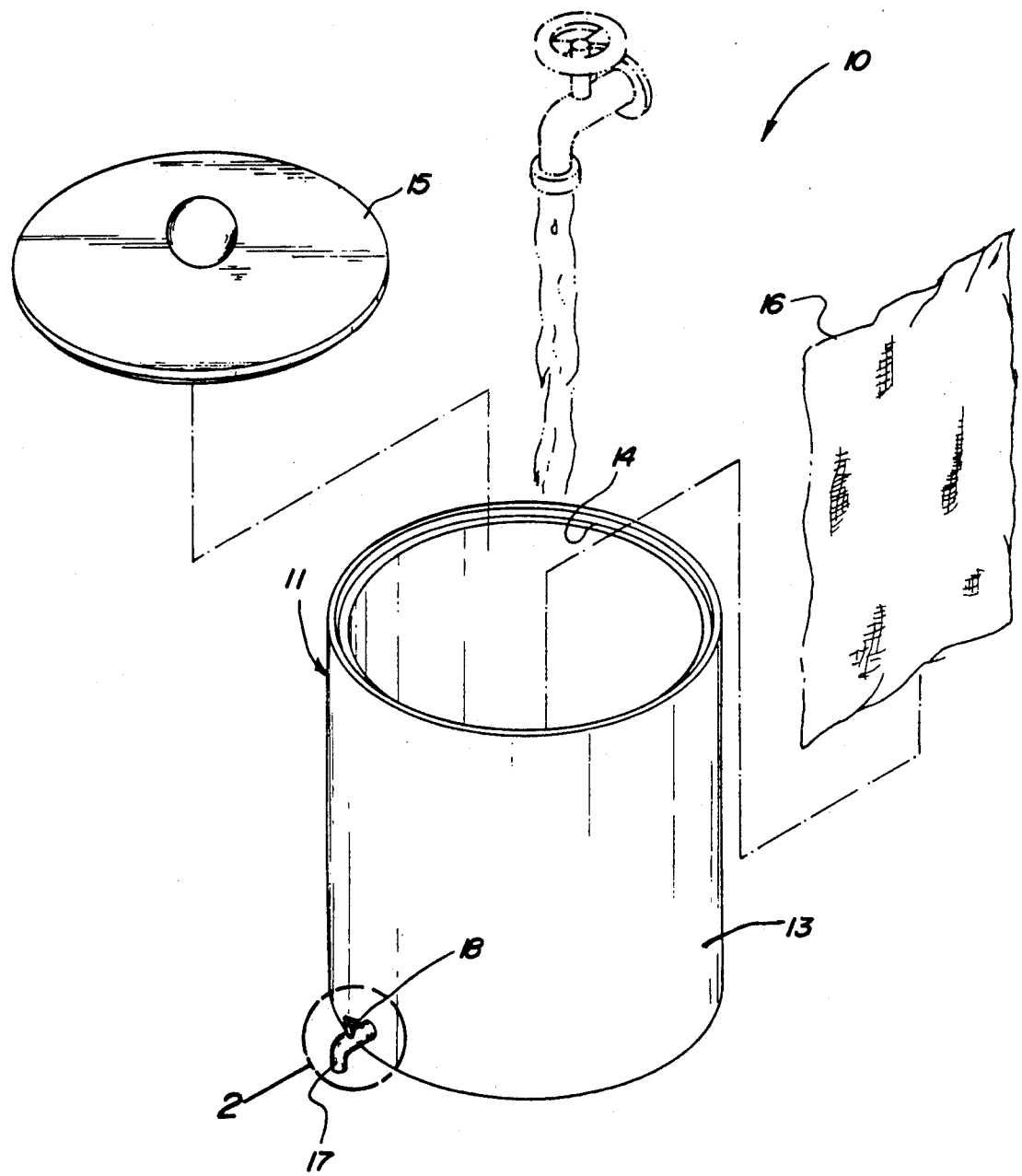
FIG. 1 is an isometric illustration of the instant invention.
Figure 2:
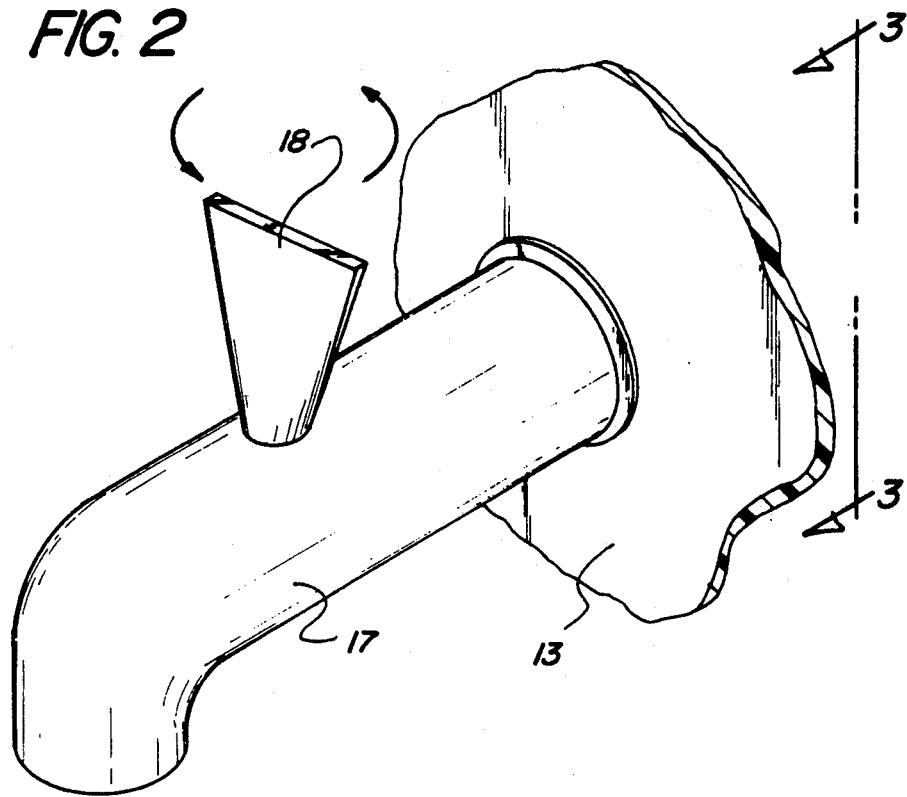
FIG. 2 is an enlarged isometric illustration of the section 2, as set forth in FIG. 1.
Figure 3:
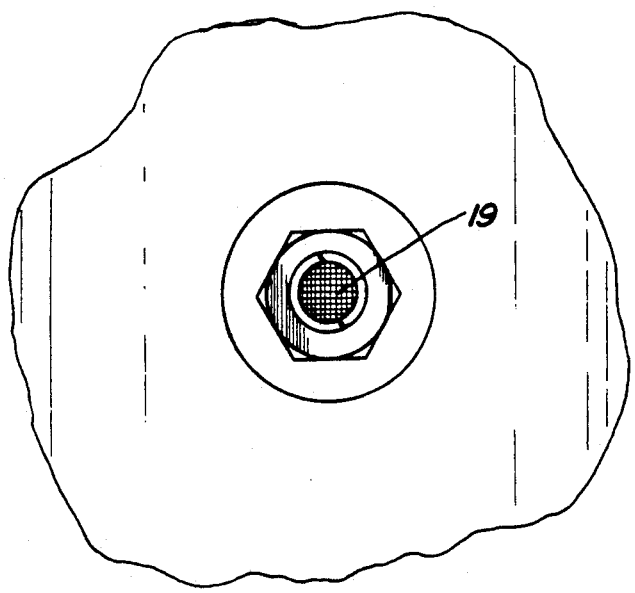
FIG. 3 is an orthographic view, taken along the lines 3—3 of FIG. 2 in the direction indicated by the arrows.
Figure 4:
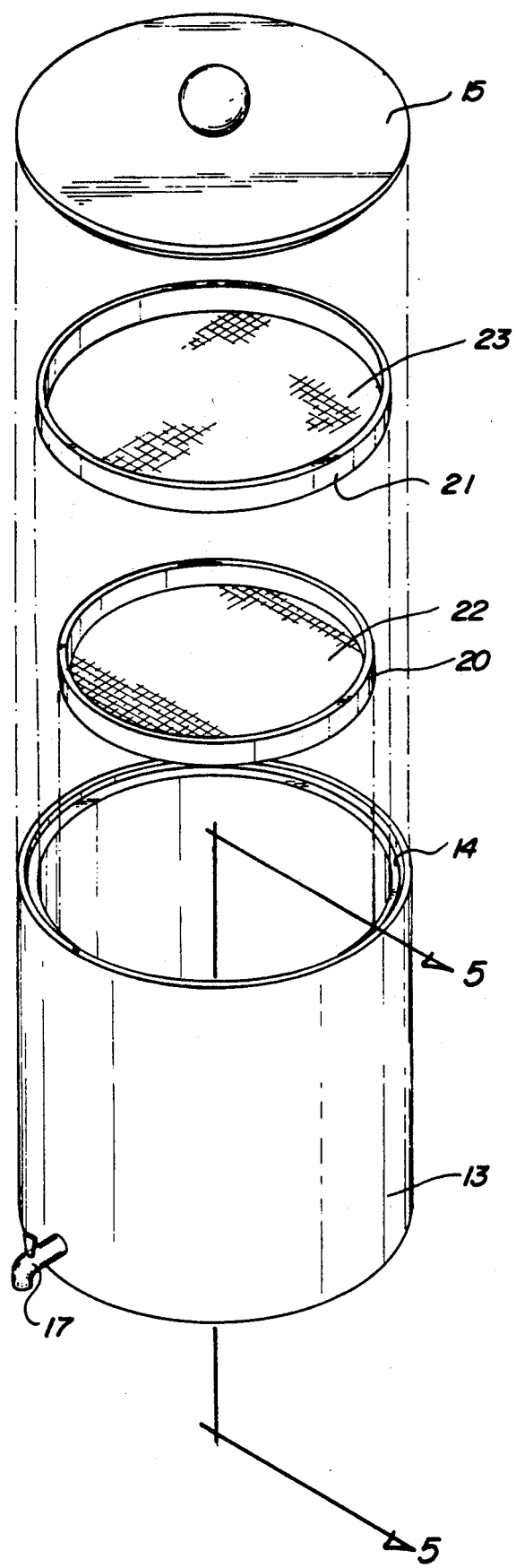
FIG. 4 is an isometric illustration of a modified aspect of the container structure of the invention.
Figure 5:
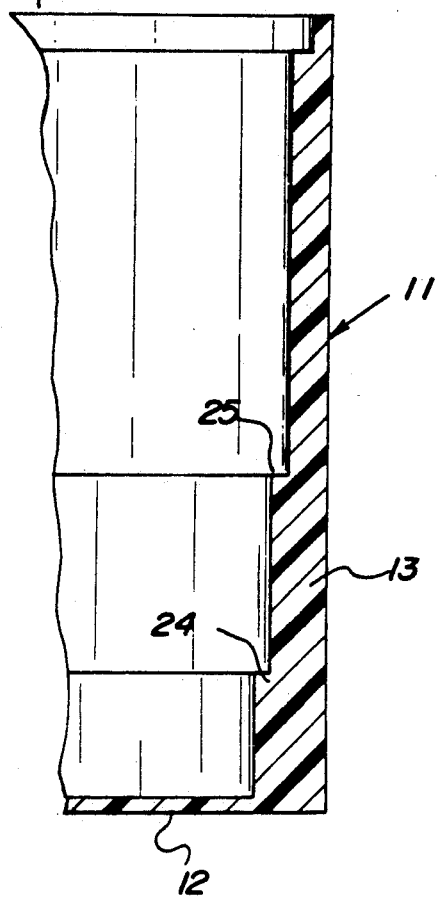
FIG. 5 is an orthographic view, taken along the lines 5—5 of FIG. 4 in the direction indicated by the arrows.
Figure 6:
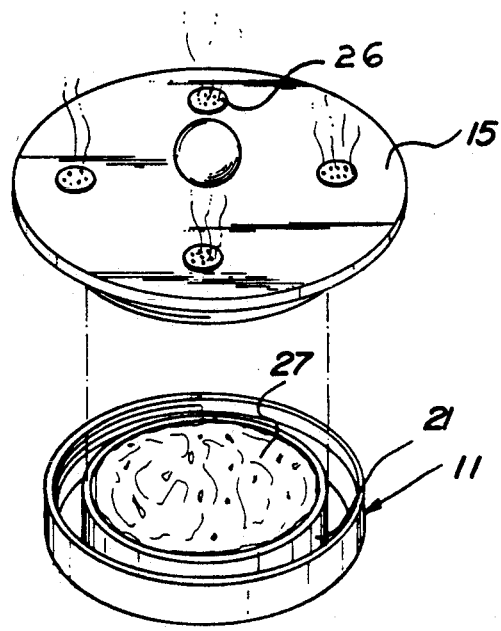
FIG. 6 is an isometric illustration of a modified lid structure utilized by the invention relative to a sponge insert for use by the support member within the container.

With reference now to the drawings, and in particular to FIGS. 1 to 6 thereof, a new and improved liquid fertilizer apparatus embodying the principles and concepts of the present invention and generally designated by the reference numeral 10 will be described.

More specifically, the liquid fertilizer apparatus 10 of the instant invention essentially comprises a container 11 having a floor 12, including a continuous cylindrical side wall 13, with the side wall including an annular lid support flange 14 adjacent and in a spaced relationship relative to the upper edge of the side wall 13. A circular lid 15 is arranged for reception upon the support flange 14. At least one porous sack 16 is directed into the container 11, with the porous sack arranged to receive various compost and manure for leaching into fluid directed into the container when fluid is directed into the container below the support flange 14 to provide for a fertilizer fluid. An outlet conduit 17 is positioned adjacent the floor 12 having a conduit valve 18 to direct selective fluid flow from within the container 11. A screen grid 19 is positioned within the outlet conduit 17 aligned with the side wall 13 to permit ease of cleaning of the screen grid 19 preventing egress of particulates from within the container.

The invention is arranged to further receive in a modified form a first and second cylindrical support member 20 and 21 respectively, having respective first and second screen floors 22 and 23 coextensive about the floor portion of the support members 20 and 21. The screen floors maintain positioning of various solids, and wherein the screen floors are each arranged to receive a support member sponge insert 27 (see FIG. 6) to impart various additives into the solution within the container 11. The first and second support members 20 and 21 are of respective first and second diameters, wherein a respective first and second support member annular flange 24 and 25 are directed into the container side wall within the container in a spaced parallel relationship, one above the other, with the second annular flange 25 positioned above the first annular flange, each flange orthogonally oriented relative to an axis 11a of the container 11 to support the respective first and second support members 20 and 21 with respective first and second flanges 24 and 25 for spaced positioning of the flanges to permit imparting of various additives into a fertilizer solution. The lid 15 is arranged to include sponge vent members 26 within the lid to permit venting through the lid by the vent members 26 while simultaneously minimizing fluid loss due to spillage or tippage of the container during use.

The container structure is arranged to be formed of various sizes, such as two and one-half gallon, five gallon, thirty gallon, etc. to create various quantities of fertilizers, as may be understood and appreciated, and it is further understood that a single or plurality of the porous sacks 16 may be utilized relative to the container structure 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A liquid fertilizer apparatus, comprising,
   a container, the container having a container floor, and a container side wall of cylindrical construction, with an annular lid support flange mounted into the container side wall adjacent an upper end of the container side wall;
   a circular lid arranged for positioning upon the support flange;
   at least one porous sack received within the container, wherein the porous sack is arranged to contain various fertilizer components therewithin for leaching into the container when fluid is directed into the container;
   an outlet conduit directed into the container adjacent the container floor, the outlet conduit including an outlet conduit valve to selectively direct fluid flow through the outlet conduit;
   first and second cylindrical support members arranged for reception within the container, the first support member having a first diameter, the second support member having a second diameter, and a first annular support flange positioned within the container adjacent the floor having said first diameter for receiving the first support member thereon, and a second annular flange directed into the container side wall within the container spaced above the first annular flange having said second diameter, wherein the second diameter is greater than the first diameter,
   the lid includes a plurality of sponge vent members formed of sponge material directed through the lid for metering and venting within said container; and
   the first support member includes a first screen floor, the second support member includes a second screen floor to permit fluid flow through the first screen floor and the second screen floor, and at least one of said first screen floor and said second screen floor includes a support member sponge insert positioned thereon for containing a fluid additive.

* * * * *